(12) United States Patent
Van Leekwijck et al.

(10) Patent No.: US 8,588,063 B2
(45) Date of Patent: Nov. 19, 2013

(54) METHOD OF PROVIDING RESOURCE ADMISSION CONTROL

(75) Inventors: Werner Van Leekwijck, Antwerp (BE);
Ali Rezaki, Issy-les-Moulineaux (FR);
Stefan Custers, Westerlo (BE); Jan Van Den Abeele, Evergem (BE); Adrianus Van Ewijk, Ekeren (BE)

(73) Assignee: Alcatel Lucent, Paris (FR)

( * ) Notice: Subject to any disclaimer, the term of this patent is extended or adjusted under 35 U.S.C. 154(b) by 331 days.

(21) Appl. No.: 11/771,809

(22) Filed: Jun. 29, 2007

(65) Prior Publication Data
US 2008/0175146 A1 Jul. 24, 2008

(30) Foreign Application Priority Data
Jun. 30, 2006 (EP) .................................... 06291097

(51) Int. Cl.
*G08C 15/00* (2006.01)
(52) U.S. Cl.
USPC ........ 370/230; 370/230.1; 370/229; 370/231; 370/234; 370/235
(58) Field of Classification Search
None
See application file for complete search history.

(56) References Cited

U.S. PATENT DOCUMENTS

| | | | |
|---|---|---|---|
| 6,137,777 A | 10/2000 | Vaid et al. | |
| 6,157,613 A * | 12/2000 | Watanabe et al. | 370/229 |
| 6,212,562 B1 * | 4/2001 | Huang | 709/227 |
| 6,345,038 B1 | 2/2002 | Selinger | |
| 6,975,621 B2 * | 12/2005 | Deshpande et al. | 370/352 |
| 2002/0161914 A1 * | 10/2002 | Belenki | 709/235 |
| 2003/0012203 A1 | 1/2003 | Deshpande et al. | |

(Continued)

FOREIGN PATENT DOCUMENTS

WO WO 01/31860 A1 5/2001

OTHER PUBLICATIONS

"Telecommunications and Internet Converged Services and Protocols for Advanced Networking (TISPAN)" ETSI Standards, European Telecommunications Standards Institute, Sophia-Antipo, FR, vol. TISPAN, No. V111, Mar. 2006, XP014033825.

(Continued)

*Primary Examiner* — Huy D Vu
*Assistant Examiner* — Zewdu A Beyen
(74) *Attorney, Agent, or Firm* — Harness, Dickey & Pierce

(57) ABSTRACT

The invention concerns a method of providing resource admission control to packet flows (11, 12, 50) associated with sessions in a communication network (2), and an access controller (21, 22) to execute this method. The communication network (2) handles packets according to priority levels assigned to the packets. The priority levels comprise at least a first and a second priority level wherein the first priority level is higher than the second priority level. First, a packet flow (12) associated with the new session is identified when packets of the packet flow (12) enter the communication network (2). Preferably, the new session is a real-time session. The second priority level is assigned to the identified packet flow and the packet flow (12) is handled according to the second priority level within the communication network (2). A congestion level is measured in the communication network (2). If the measured congestion level stays below a predefined threshold, the priority level of the packet flow (12) associated with the new session is upgraded from the second priority to the first priority within the communication network (2). Once upgraded, the packet flow (12) is handled according to the first priority level within the communication network (2) until the packet flow (12) is terminated.

9 Claims, 2 Drawing Sheets

(56) References Cited

U.S. PATENT DOCUMENTS

| | | | |
|---|---|---|---|
| 2003/0058851 A1* | 3/2003 | Goldman | 370/389 |
| 2003/0076791 A1* | 4/2003 | Sawabe et al. | 370/328 |
| 2003/0107991 A1* | 6/2003 | Tezuka et al. | 370/229 |
| 2003/0193395 A1* | 10/2003 | Ahiska et al. | 340/540 |
| 2004/0170127 A1* | 9/2004 | Tanaka | 370/235 |
| 2005/0025050 A1 | 2/2005 | Roeder | |
| 2006/0072522 A1* | 4/2006 | Chandra et al. | 370/338 |
| 2007/0223372 A1* | 9/2007 | Haalen et al. | 370/229 |
| 2009/0138596 A1* | 5/2009 | Song | 709/225 |

OTHER PUBLICATIONS

Korean Notice of Preliminary Rejection dated Apr. 19, 2012 for Application No. 10-2008-7031763 and English Translation thereof.

\* cited by examiner

METHOD OF PROVIDING RESOURCE ADMISSION CONTROL

BACKGROUND OF THE INVENTION

The present invention is based on a priority application EP 06 291 097.1 which is hereby incorporated by reference.

The present invention relates to a method of providing resource admission control to a packet flow in a communication network, and an access controller to execute said method.

As IP networks are increasingly used to transport real-time, in-elastic traffic with hard QoS (=Quality of Service) guarantees, appropriate traffic management becomes increasingly challenging (IP=Internet Protocol). Proactive traffic management schemes rely on RAC (=Resource Admission Control) for new sessions that have to be set up. The aim of RAC is to determine if the network can carry the new session at the appropriate QoS without impacting the QoS specifications of already ongoing real-time sessions. Especially the latter is of extreme importance in IP networks as in the (pre-dominantly used) diffserv-like model, a new session that is admitted to run at the highest QoS class level while there are not sufficient resources in the network to sustain that session, will not only be adversely affected by that lack of resources, but will also impact the other sessions running at the same QoS class level.

Current envisaged solutions either assume that the network is dimensioned in a way that no problems can arise, or rely on a central resource manager having a (theoretical) model of the available resources in the network, and which is queried for acceptance on each new session set-up, e.g. TISPAN RAC Functions and Architecture (TISPAN=Telecoms & Internet converged Services & Protocols for Advanced Networks).

The assumption of over-dimensioning the network is not realistic for a variety of reasons, such as: with the ever growing amount of traffic, it is not trivial to assure that there will be always enough resources in the network to avoid any congestion problems. Even if the average traffic would be predictable, mass events such as tele-voting will cause peaks of traffic in which problems will occur. For economical reasons, access and aggregation networks are not non-blocking and will cause traffic congestion if no measures are taken.

In the model with a central resource controller, the central entity has to be queried to accept or deny each new session request. This leads to the following drawbacks. Increased complexity and increased latency in session set-up: the signalling flow for setting up the session must be interleaved with the resource queries to the resource controller, adding to the end-to-end set-up delay (Multiple round-trip signalling plane interactions).

Another drawback is that a failure of access to the central resource controller services leads to unavailability of the service. As no resources can be granted, all new sessions will be rejected.

Still another drawback is that the resource controller uses a (pre-configured) model of the network resources upon which it grants or refuses new session requests (resource counting). A change in network topology, maintenance activities, or network link failures require a change to the model, which is not updated in real-time. This makes the network resource controller work with a model that does not fit reality for a certain amount of time.

Another drawback is that RAC-based solutions can lead to underutilization of available network capacity as an application will tend to reserve more resources than effectively needed, as, e.g. with non-CBR traffic based services (CBR=Constant Bit Rate).

SUMMARY OF THE INVENTION

It is the object of the present invention to provide an improved resource admission control.

The object of the present invention is achieved by a method of providing resource admission control to packet flows associated with sessions in a communication network, the communication network handling packets according to priority levels assigned to the packets and the priority levels comprising at least a first and a second priority level wherein the first priority level is higher than the second priority level, wherein the method comprises the steps of identifying a packet flow associated with a new session, in particular a new real-time session, when packets of the packet flow enter the communication network, assigning the second priority level to the identified packet flow and handling said packet flow according to the second priority level within the communication network, measuring a congestion level in the communication network, if the measured congestion level stays below a predefined threshold, upgrading the priority level of said packet flow associated with the new session from the second priority level to the first priority level; and handling said packet flow according to the first priority level within the communication network until the packet flow is terminated. The object of the present invention is further achieved by an access controller for providing resource admission control to packet flows associated with sessions in a communication network, the communication network handling packets according to priority levels assigned to the packets and the priority levels comprising at least a first and a second priority level wherein the first priority level is higher than the second priority level, wherein the access controller comprises a control unit adapted to identify a packet flow associated with a new session, in particular a new real-time session, when packets of the packet flow enter the communication network, assign the second priority level to the identified packet flow and handling said packet flow according to the second priority level within the communication network, measure a congestion level in the communication network, if the measured congestion level stays below a predefined threshold, upgrade the priority level of said packet flow associated with the new session from the second priority level to the first priority level, and handle said packet flow according to the first priority level within the communication network until the packet flow is terminated.

With the present invention, new sessions are always and immediately allowed to run in a communication network at the second highest priority level. Consequently, there is no additional latency in session set-up for sessions. The invention may be particularly useful for real-time sessions. Real-time in the sense of the invention may be any packet flow transporting packets with a time-critical content, e.g., a VoIP telephone session, an IP-TV session or a Video-On-Demand session (TV=Television).

The present invention does not rely on a central resource model, i.e., the notion of a central resource controller does not exist. Therefore, a system following the approach of the present invention can never suffer complete service unavailability or service disruption. Only broken network elements or links can impact the system, and only for flows that would require that network element or those links.

As the invention does not use a, possibly predefined, model of the network resources upon which it grants or refuses new session requests, there is no issue of mismatch between a theoretical network resource model and real network status or real queue behaviour.

Moreover, the present invention prevents an increase of signalling plane complexity and ensures a low-latency session set-up since the call signalling flow for setting up the session is not required to be interleaved with the resource queries to the resource controller. Multiple round-trip signalling plane interactions are not necessary.

What is more, the invention meets the needs of users who actually prefer having a slightly less quality over having their session request rejected.

Generally, the present invention leads to a better utilization of forwarding plane capacity and works with the actual resources available in the network (e.g., congestion signalling is done by the network elements carrying the traffic).

Further advantages are achieved by the embodiments of the invention indicated by the dependent claims.

According to a preferred embodiment of the invention, the access controller marks arriving packets with a traffic class identifier before granting the packets access to the network. It is possible that two different priority levels are distinguished in the network, a lower and a higher priority level. Let us assume that a packet arriving at the access controller is associated with a well-established ongoing session. Then the packet will be marked with an identifier indicating the higher priority level. Alternatively, if the packet is associated with a new session, the packet packet will be marked with an identifier indicating the lower priority level.

"Well-established session" or "established session" in the sense of the invention means that the session is not a new session but that the session has been already ongoing for quite a while and has been allocated a higher priority level than new sessions.

According to another embodiment, the network may comprise more than two priority levels. Then, packets associated with more significant sessions will be assigned with a relatively high priority level and packets associated with less significant sessions will be assigned with a relatively low priority level. For example, at the access controller, all incoming packets for new flows will be remarked to traffic class "hi−1", i.e., "high minus 1", before being allowed into the network. This will ensure that packets from new flows will never impact well-established sessions which belong to a higher priority class "hi", i.e., "high".

It is also possible that the communication network implements a plurality of different priority levels. There may be two or more different basic priority classes on the basis of a first parameter other than new and well-established. Within each of the mentioned basic priority classes, a set of second priority levels will be applied on the basis of a second parameter other than new and well-established. In any of the mentioned second priority classes, packet flows may be classified dependent on the criteria "real-time or non real-time". This priority architecture may continue down to a level where the packet flows will be categorized into different levels dependent whether they are "new or well-established". Thus, a multi-layered priority level system on the basis of a plurality of classification parameters may be realised with the present invention, whereby a classification will be enforced dependent whether a packet flow is new or well-established.

The terms "highest priority/second-highest priority level" or "hi/hi−1" used in this description with regard to a two-priority-levelled network may be exchanged with the terms "higher priority level/lower priority level" or "hi−x/hi−y", with x, y=1, 2, 3, etc. and x<y, with regard to a multi-priority-levelled network, and vice versa, while staying within the framework of the present invention.

According to another preferred embodiment of the invention, it is monitored whether a congestion level associated with the packet flow exceeds a certain limit. This monitoring may be done by the access controller at the ingress or egress of the network and/or by any other network element of the communication network. If the congestion problems associated with the new session do not exceed a predefined level or none of the packets of said packet flow associated with the new session experiences any congestion during the monitoring, the access controller upgrades the packet flow associated with the new session, e.g., from the second highest priority level to the highest priority level within the network.

In a preferred embodiment, the access controller monitors an occurrence of (near-)congestion associated with the packet flow by checking—for one or more packet flows of the second-highest priority level—whether an explicit congestion signalling has occurred. One way of doing this is that the egress access controller, i.e., the access controller at the egress of the network, checks (near-)congestion marking on packets, and signals to the ingress access control, i.e., the access controller at the ingress of the network, that a certain flow has congestion associated. After a—preferably predefined/configured—time of non-congestion at the second highest priority level, a session is upgraded from "new" to "well-established", and the corresponding packets are treated in the high priority level queue. In case of congestion detected at the second highest priority level queues, the corresponding one or more sessions are not upgraded.

According to a preferred embodiment, there is a signalling of the congestion associated with a particular flow from one or more network elements and/or egress access controller to the ingress access controller. Preferably, measuring the congestion level in the communication network may comprise the step of detecting that a signalling of the congestion associated with a particular flow from one or more network elements and/or egress access controller to the ingress access controller occurs.

According to still another preferred embodiment, only the access controllers are flow/session aware, and the other network elements just see packets at the two priority levels. If a network element marks a "hi−1" packet because of a (near-) congestion, the egress access controller could associate this marked packet to a flow, and inform the ingress access controller about the congestion status associated with that flow.

Preferably, the access controller will monitor explicit congestion signalling for all packet flows of class "hi−1". When a certain flow has never had any packets marked for congestion for a (configurable) period of time, that flow is interpreted as "absorbable" by the network (as it seems not ever to be bothered by any of the class "hi" flows), and hence would also not impact any of the flows of the "hi" class if it would run at that level. Hence, the access controller "upgrades" the flow to the "hi" class. From that time onwards, all packets belonging to the packet flow entering the network will be marked to traffic class "hi".

Flows running at class "hi" will remain at that level, until the session is terminated. Session terminated can either be explicitly signalled to the network, or detected by the access controller, based on a pre-defined period of inactivity, i.e. a period with no packets for the flow.

According to another preferred embodiment of the invention, each network element of the network comprises a first queue and a second queue whereby the first queue and the second queue are coupled and handled together. Packets of well-established sessions of the network are put in the first queue which handles the packets of the well-established sessions with the highest priority level within the network. On the other hand, packets of the new session are put in the second queue handling the packets of the new session with the second-highest priority level within the network without negatively influencing the packets of the well-established sessions. This assures that new sessions never impact, i.e., negatively influence the established sessions.

The filling levels of both queues and/or the actual data rates associated with the queues may be used to calculate or determine a congestion level (or a congestion status) which is compared to a predefined threshold to decide about signalling congestion for one or more of the new sessions. A data rate may be a measure for the transmission volume per time unit of the one or more packet flows associated with a specific queue. Preferably, the network elements—not the access controllers—are only responsible for monitoring a congestion status and signal it. Upgrading a flow is done only by (ingress) access controllers.

It is also possible that only a single queue exists where both the packets assigned with the higher priority level and the packets assigned with the lower priority level are put into. The queue may process the waiting packets in an intelligent way such that the higher prioritized packets experience a preference with respect to the lower prioritized packets. Such a single queue approach comprises the logic to supervise all packets in the queue.

According to another preferred embodiment of the invention, the access controllers can identify when a new real-time flow is entering the network. The identification of a real-time flow can be done either using an application-supported explicit out-of-band signalling interaction (e.g. SIP for multimedia sessions), or by using DSCP bits in the IP header, or by an application-transparent, autonomous flow-identification (SIP=Session Initiation Protocol; DSCP=Differentiated Service Code Point). The identification that it is a new flow can be based on the characterization of the flow inside the signalling messages (e.g. SDP description) or by the fact that the 5-tuple <origin address, origin port, destination address, destination port, transport protocol> is not known yet to the access controller (SDP=Session Description Protocol).

Preferably, in-network access controllers, also known as policers, are responsible for marking the packet flows with the correct priority level and applying traffic limits, e.g., BW (=bandwidth) rate limits, peak BW, leaky bucket parameters, on established sessions or new sessions upgraded to the first priority. For example, for each real-time flow, the access controller will install and operate a bandwidth supervision and rate limiting function. The rate limiter parameters can be deduced from a combination of the (optional) out-of-band signalling interaction (e.g. SDP description in SIP messages), network operator policy (e.g. fixed BW budget for voice calls), and the actual BW usage of the flow (measurement-based).

The traffic limiter may be installed before upgrading the flow. The timing sequence can be described by three time points t1, t2, t3 on a time arrow between 0 and the end of the flow. In a first time period [0, t1], the flow is characterized in terms of BW/throughput behaviour. The flow is running at the second priority level. At t1 the traffic filter is installed at the ingress. In some cases, t1 may be equal to 0, e.g., there is an explicit signaling for the flow. t1 may be fixed for all new flows, or depend on the specific flow characteristics. In a second time period [t2, t3], the (near-)congestion is measured, i.e., if any of the packets of the flow would cause a near-congestion event, such as queue fill levels crossing a boundary. In general, 0<t2<=t1 (theoretical, t2 could be >t1, but then [t1, t2] is lost time in which no actions are undertaken. Most useful is when t2 is equal to t1.) At t3, the flow is upgraded to the first priority level if no congestion was detected for this flow. Generally, t3 is greater than t1. In a third time period [t3, end of flow], the flow runs at the first priority, and the traffic limiter in the ingress access controller is active.

Packets that do not conform to the installed rate limiter, can either be dropped, or passed on the second priority level.

Care must be taken with the interaction between the rate limiter and the congestion signaling mechanism: its must be ensured that the packet flow will not use more BW once upgraded to level "hi" as it did when running at level "hi−1". This implies that the flow should reach its maximum (as determined by the rate limiter) for a sufficient amount of time during the "hi−1" phase. Otherwise, the not-congestion-marking during the "hi−1" phase is not guaranteeing anything for the later phase, e.g., in case the BW of the flow would increase, but still remain below the rate limit.

The BW consumption of a packet flow associated with a new session may be monitored for a specific period of time. The time period of monitoring a new session may be predefined but not necessarily constant. The time of monitoring can be a function of the flow characteristics. For instance, a low-BW steady flow might need less monitoring than a high-BW fluctuating flow.

After the end of the monitoring time period, if the decision is taken that the priority level assigned to the packets of said packet flow should be upgraded, a BW limit may be applied to said packet flow of the new session and/or to one or more packet flows of well-established sessions running in the network. It is possible that a mean value of the BW consumed by the packet flow of the new session during the monitored time period is calculated and applied as bandwidth limit to the upgraded new session.

BRIEF DESCRIPTION OF THE DRAWINGS

These as well as further features and advantages of the invention will be better appreciated by reading the following detailed description of presently preferred exemplary embodiments taken in conjunction with accompanying drawings of which:

FIG. 1 shows a telecommunications system 1 with clients 31, 32, 41, 42 using a packet-based communication network 2 comprising access controllers 21 and 22 and at least one network element 23. Further, it is also possible that the communication network 2 comprises no network element and that only access controllers exist. In the telecommunications system 1, a packet flow 11 associated with a well-established real-time session between a first client 31 and a second client 41 and another packet flow 12 associated with a new real-time session between a third client 32 and a fourth client 42 are transmitted through the network 2 via the access controllers 21 and 22 and the network element 23.

Figure 1:
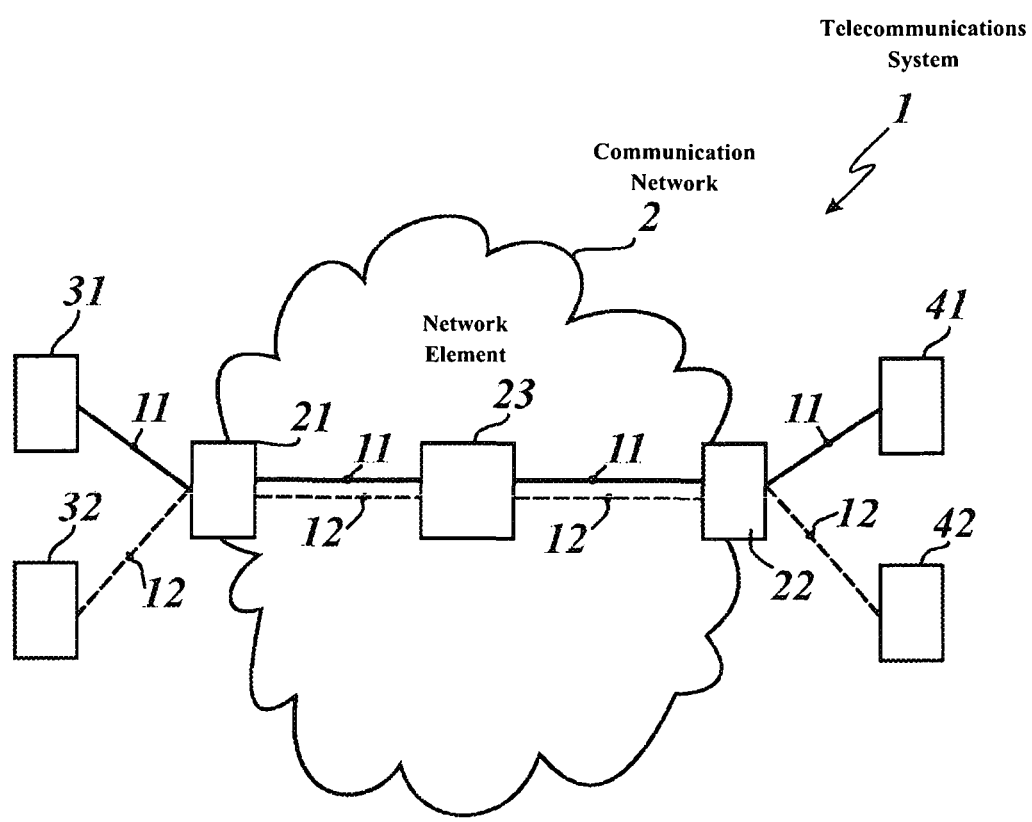
FIG. 1 is a block diagram of a network according to an embodiment of the invention

The clients 31, 32, 41, 42 may be telecommunications devices, e.g., software phones or hardware telephone sets for making VoIP telephone call (VoIP=Voice over IP).

The network 2 is a communication network, e.g., an IP-based network, where data are connectionlessly transported in form of packets. The first client 31 has set up a session, e.g., a VoIP session, with the second client 41 across the network 2. For example, the session setup has been executed by means of SIP, and a packet flow 11 is being exchanged via the session using, e.g., the transport protocol RTP (=Real-Time Transport Protocol). The session is called well-established because the telecommunications system 1 has classified the session with a high priority level and allocates to the session as much bandwidth as the session requires.

The network element 23 may be any network node, such as a router or a switch, processing the packet flows 11 and 12. The access controllers 21 and 22 represent access nodes used for entering the network 2. Packets entering the network 2 at the access controller 21 are examined with regard to their origin, destination, and transport protocol. Likewise, packets entering the network 2 at the access controller 22 are also examined with regard to their origin, destination, and transport protocol. Corresponding to the examination result, the access controllers 21 and 22, respectively, assign a priority level to the packets entering the network 2.

From a point of view where packets originate from the clients 31, 32 and are targeted to the clients 41, 42, the access controller 21 may be regarded as an ingress access controller and the access controller 22 may be regarded as an egress access controller whereby ingress and egress relate to the transmission direction through the network 2.

The third client 32 has only recently established a new real-time session with the other client 42, and the third client 32 has just begun to send a packet flow 12 corresponding to the new real-time session via the network 2 to the fourth client 42.

Figure 2:
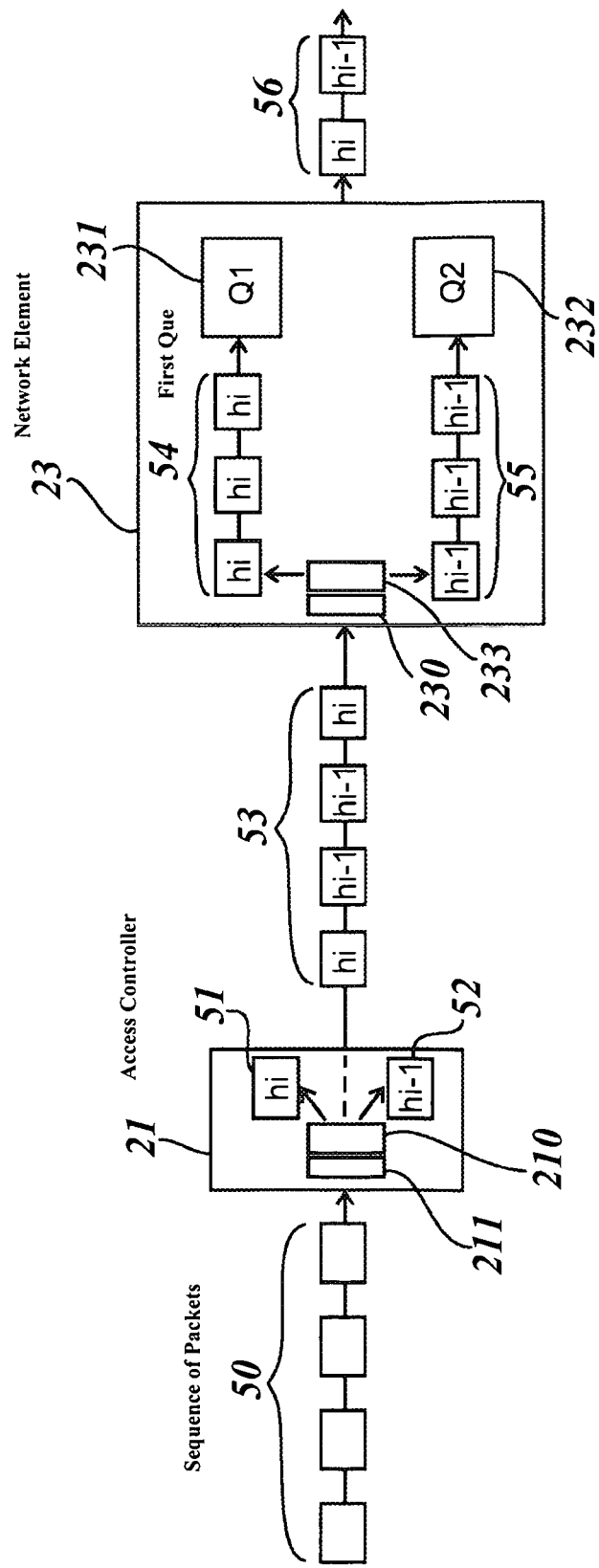
FIG. 2 is a schematic view of the processing of packet flows according to an embodiment of the invention message

FIG. 2 shows a sequence of packets 50 arriving at the access controller 21. The sequence of packets 50 comprises packets associated with the packet flow 11 originating from the first client 31 and packets associated with the packet flow 12 originating from the third client 32. The first client 31 is engaged in a well-established real-time session whereas the third client 32 is engaged in a new real-time session. A packet flow consists of individual packets which have the same origin and the same destination and which belong to the same session.

An interface 211 of the access controller 21 receives the packets of the sequence of packets 50 and forwards the packets to a control unit 210 of the access controller 21.

The control unit 210 examines whether a received packet flow belongs to a real-time session because real-time sessions are time-critical and have to be handled with a higher priority level than other, non real-time sessions. If an incoming packet flow belongs to a real-time session, the control unit 210 further examines whether the packet flow is associated with a well-established session or a new session. This examination will not be executed if a received packet does not belong to a real-time session. A real-time session may be a session used for the transmission of voice, video or other streaming data.

For the examination purpose, the control unit 210 examines the packets of the packet sequence 50 with regard to their origin, destination, and transport protocol. Preferably, the control unit 210 checks for each arriving packet the following information quintuple: origin address, origin port, destination address, destination port, transport protocol, which may be contained within the header of a packet. If the control unit 210 finds that a packet possesses a quintuple not known to the control unit 210, the control unit 210 classifies the packet as associated with a packet flow of a new session. It is also possible that a packet flow of a new session is identified by means of corresponding signalling messages which are received and examined by the control unit 210.

Otherwise, if the control unit 210 finds that a packet possesses a quintuple already known to the control unit 210, the control unit 210 realises that the packet does not belong to a new session. The control unit 210 distinguishes three cases: It is possible that the packet belongs to a packet flow of a well-established session. Alternatively, the packet may belong to a session that has not been upgraded to the first priority level "hi" yet, either because it is still in the monitoring phase, or because the packet flow had congestion associated with it and hence did not get upgraded.

According to the examination result, the control unit 210 either classifies a received real-time packet and the corresponding packet flow as associated with a well-established session or not. In the former case the control unit 210 assigns a first priority level "hi" to a packet 51, in the latter case the control unit 210 assigns a second priority level "hi–1" to a packet 52. For example, the first priority level "hi" represents a highest priority level in the network while the second priority level "hi–1" represents a second-highest priority level in the network. Preferably, the control unit 210 marks the assigned priority level in a header field of each packet. For instance, like in the differentiated service (=DiffServ), the control unit 210 uses the first six bits of the ToS byte in the header of a IPv4 packet or the class field in the IP header of an IPv6 packet (ToS=Type of Service; IPv4/6=IP version 4/6).

Generally, flow-aware access controllers 21 on the edge of the network 2 are responsible for classifying incoming packets 50 in the correct traffic class 51 and 52. Packet flows of new real-time sessions are always and immediately allowed to run at the second highest priority level. At this level, data flow is possible end-to-end but the session may be impacted by other sessions in the network. Best-effort data is handled at the lowest priority level, and hence out of scope of this description. Best-effort traffic will continue to operate through proven reactive traffic management, e.g. TCP e2e mechanisms (TCP=Transmission Control Protocol; e2e=end-to-end).

The marked packets 53 are then admitted by the access controller 21 to the network 2. Let us assume that the marked packets 53 encounter on their routing path the network element 23. The network element 23, which may be, e.g., a router or a switch, comprises an interface 230 for receiving the packets 53. The interface 230 forwards the packets 53 to a control unit 233 which places each received packet, according to its priority level mark, into a corresponding queue 54, 55 for further processing.

FIG. 2 shows two queues, a first queue 54 comprising the packets of the highest priority level "hi" and a second queue 55 comprising the packets of the second-highest priority level "hi–1". As long as the first queue 54 is not empty, the packets comprised within the first queue 54 are processed in the processing unit 231. The packets of the first queue 54 are assigned the highest priority level within the network 2. Whenever there are unused resources available, also the packets comprised within the second queue 55 are processed in the processing unit 232. The packets of the second queue 55 are assigned the second-highest priority level within the network 2.

It is possible that the network provides not only two priority classes such as "hi" and "hi–1" but that the packets are classified in a more elaborate set of classes such as "hi", "hi–1", "hi–2", "hi–3", etc. Likewise, the bandwidth resources of the network may be divided among different packet types and an individual priority approach may be applied within each packet type. For instance, the network may distinguish between packets related to emergency calls, real-time packets, non-real-time packets, and packets transporting data related to web downloads. Within each of these classes, a set of classes may be enforced by the network system. However, in order to simplify the description of the invention, we will limit the description to an exemplary system comprising two different priority levels, only, i.e., a highest priority level and a second-highest priority level. Sometimes, we will also speak of a highest priority level and a second-highest priority level, meaning the same thing, i.e., two or more priority classes with different preference levels.

In-network elements such as the network element 23 handle the real-time traffic using two queues with priorities hi and hi-1 and applying some form of AQM congestion signalling methods (such as ECN, XCP or VCP) for the packets in the second-highest priority level queue hi-1, based on thresholds using a combination of both queue filling levels (AQM=Active Queue Management; ECN=Explicit Congestion Notification; XCP=Explicit Control Protocol; VCP=Variable-Structure Congestion Control Protocol).

The access controller 21 monitors the processing in the network element 23, especially whether packets in the second-highest priority level queue 55 encounter a congestion event. For example, the access controller monitors the network element 23 for a defined time period after admitting a new session to the network 2. The monitoring may be maintained during a time period of, e.g., one minute or ten minutes. The longer the monitoring is maintained, the better—i.e., the more precise—can be predicted how the new session will behave, i.e., how much bandwidth it will demand.

The monitoring may also take place in any of the network elements, e.g., by checking the filling level of queues provided in the network elements, and any congestion issues may be reported to the other relevant network elements, e.g., the access controllers 21, 22. It is also possible that the access controllers 21, 22 at the edge of the network 2 realize that a congestion problem has arisen if they receive signalling message related to congestion issues. In practice, e.g., using ECN, XCP, or VCP, the network element 23 would mark the packets that exceed the queue level. The egress access controller 22 would identify the marked packets and the flow to which they belong, and notify the ingress access controller 21 about the flow that experienced congestion.

If packets of the new session in the second-highest priority level queue 55 are not subject to a congestion event during the monitoring time period, new packets of that session arriving at the access controller 21 are upgraded, by the access controller 21, from the second-highest priority level to the highest priority level. Once the session is upgraded, the new session is allocated a bandwidth on the first priority level dependent on the bandwidth that was required by the session during the monitoring on the second priority level.

If, however, packets of the new session in the second-highest priority level queue 55 encounter a congestion event during the monitoring time period, new packets of the session arriving at the access controller 21 are continued to be kept in the hitherto priority class, i.e., at the second-highest priority level.

This means that sessions may be upgraded to the highest priority level based on measured congestion levels in the network. Thus, the priority classification follows the actual capacity of the network and the available resources. Preferably, the monitoring is repeated, e.g., on a regular basis, in order to adjust the packet processing to a current change in the network capacity. In another preferred embodiment, the monitoring is executed to check whether any congestion problems can be detected on the highest priority level. Congestion problems may mean that the queue is getting filled.

In still another preferred embodiment, the congestion situation on two or more priority levels, preferably on all priority levels, considered in the network is monitored simultaneously. If congestion problems arise on a priority level, the congestion issues are reported to the relevant network elements, e.g., the access controller.

It is also possible that—in the case of monitoring a (near-)congestion of a packet flow in a queue of the network element 23—the corresponding packets are marked, by the network element 23, with a (near-)congestion marking. Once the marked packets arrive at the egress access controller 22, i.e., the access controller 22 at the egress of the network 2, the egress access controller 22 detects the (near-)congestion marking on the packets and signals to the ingress access controller 21, i.e., the access controller 21 at the ingress of the network 2, that a certain flow has congestion associated.

From an all-inclusive resource point of view, to monitor a congestion in the network 2, it is required to take into consideration all existing queues. According to this embodiment, the bandwidth resources of the network 2 are seen from a comprehensive point of view comprising all priority levels of the network 2.

After processing the packets in the network element 23, e.g., routing the packets in the given priority level, the processed packets 56 continue their way to their destination and may encounter another network element where they are again processed according to their priority level mark.

Once upgraded, sessions cannot be impacted anymore by other—established or new—sessions. Second priority packets cannot influence the handling of first priority packets. Therefore, it is necessary that the access controller installs and operates a bandwidth supervision and rate limiting function.

In a preferred embodiment, bandwidth rate limits are enforced on the well-established sessions of the network once the system has decided to upgrade a new session to the first priority level. These bandwidth limits may be pre-defined or may be determined from observing the packet flow.

Any of the bandwidth rate limiting mechanisms known in the art may be used for sharing the available bandwidth resources of the network among the parallel running sessions.

The invention claimed is:

1. A method of providing resource admission control to packet flows associated with sessions in a communication network, the communication network handling packets according to priority levels assigned to the packets and the priority levels including at least a first and a second priority level, the method comprising:
    identifying a packet flow associated with a new session when packets of the packet flow enter the communication network;
    assigning the second priority level to the identified packet flow upon identifying the packet flow and handling said identified packet flow according to the second priority level, the first priority level being associated with an established session and the first priority level being of a higher priority level than the second priority level;
    measuring a congestion level in the communication network, the measuring the congestion level being based on monitoring congestion levels associated with all packet flows on the second priority level and the first priority level;
    if the measured congestion level stays below a threshold, upgrading the priority level of said identified packet flow associated with the new session from the second priority level to the first priority level; and
    handling said identified packet flow according to the first priority level within the communication network until the packet flow is terminated.

2. The method of claim 1, wherein measuring the congestion level is based on monitoring congestion levels associated with the identified packet flow for a predefined or variable period of time.

3. The method of claim 1, wherein the method further comprises: monitoring an occurrence of congestion associated with the identified packet flow; and if none of the packets of said packet flow has experienced any congestion during the monitoring, upgrading the priority level of the identified packet flow associated with the new session from the second priority level to the first priority level.

4. The method of claim 1, wherein the method further comprises: monitoring of filling levels of queues in the communication network assigned to the first or the second priority level or of an actual data rate associated with said queues.

5. The method of claim 1, wherein the method further comprises:
monitoring the bandwidth consumption of the identified packet flow associated with the new session when handling the identified packet flow according to the second priority level within the communication network;
setting an individual traffic limit based on the monitored bandwidth consumption; and handling the identified packet flow upgraded to the first priority level in compliance with the set traffic limit.

6. The method of claim 1, wherein the method further comprises: identifying the packet flow associated with the new session based on a characterization of the packet flow inside signaling messages or by the fact that address information in the packet header is not yet known to a network element controlling the access to the communication network.

7. An access controller for providing resource admission control to packet flows associated with sessions in a communication network, the communication network handling packets according to priority levels assigned to the packets and the priority levels comprising at least a first and a second priority level wherein the first priority level is higher than the second priority level and the first priority level being associated with an established session, wherein
the access controller comprises a control unit configured to identify a packet flow associated with a new session, in particular a new real-time session, when packets of the packet flow enter the communication network, the control unit further configured to assign the second priority level to the identified packet flow upon the control unit identifying the packet flow and handling said identified packet flow according to the second priority level within the communication network, the control unit further configured to measure a congestion level in the communication network based on monitoring congestion levels associated with all packet flows on the second priority level and the first priority level, if the measured congestion level stays below a threshold, upgrade the priority level of said identified packet flow associated with the new session from the second priority level to the first priority level, the control unit further configured to handle said identified packet flow according to the first priority level within the communication network until the packet flow is terminated.

8. The access controller of claim 7, wherein the control unit is further configured to mark the packets with a priority level identifier in the header of the packets before granting the packets access to the communication network.

9. The access controller of claim 7, wherein the control unit is further configured to apply traffic limits on a packet flow of the first priority level, and to drop packets of said packet flow or downgrade packets of said packet flow if said packet flow does not comply with said traffic limits.

* * * * *